(12) United States Patent
Lindsay et al.

(10) Patent No.: US 12,337,637 B2
(45) Date of Patent: Jun. 24, 2025

(54) CLAMP GROUP AND ROUND AXLE WITH ALIGNMENT FEATURES

(71) Applicant: HENDRICKSON USA, L.L.C., Schaumburg, IL (US)

(72) Inventors: Sean T. Lindsay, Schaumburg, IL (US); Ryan M. Ettenhofer, Schaumburg, IL (US); Michael P. Robinson, Schaumburg, IL (US); Ashley T. Dudding, Schaumburg, IL (US); Richard J. Aumann, Schaumburg, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 18/554,183

(22) PCT Filed: Mar. 9, 2022

(86) PCT No.: PCT/US2022/019460
§ 371 (c)(1),
(2) Date: Oct. 5, 2023

(87) PCT Pub. No.: WO2022/216398
PCT Pub. Date: Oct. 13, 2022

(65) Prior Publication Data
US 2025/0010677 A1    Jan. 9, 2025

Related U.S. Application Data

(60) Provisional application No. 63/171,425, filed on Apr. 6, 2021.

(51) Int. Cl.
B60G 11/113    (2006.01)

(52) U.S. Cl.
CPC ........ *B60G 11/113* (2013.01); *B60G 2202/11* (2013.01); *B60G 2204/4306* (2013.01)

(58) Field of Classification Search
CPC .............. B60G 11/113; B60G 2202/11; B60G 2204/4306
See application file for complete search history.

(56) References Cited

U.S. PATENT DOCUMENTS

| 8,480,108 B2 | 7/2013 | Ryshavy et al. |
| 9,050,873 B2 | 6/2015 | Dilworth et al. |

(Continued)

FOREIGN PATENT DOCUMENTS

| DE | 29612129 U1 | 12/1996 |
| EP | 4232778 C1 | 9/1992 |

(Continued)

OTHER PUBLICATIONS

International Search Report and Written Opinion for US Application PCT/US2022/019460 mailed on Mar. 9, 2022, with above references.

*Primary Examiner* — Faye M Fleming
(74) *Attorney, Agent, or Firm* — Cook Alex Ltd.

(57) ABSTRACT

A clamp group mounting of a leaf spring to a round axle including alignment features is disclosed, which includes a round axle, a leaf spring and a clamp group connecting the leaf spring to a laterally extending axle. A locator ring is welded to an upper arcuate surface of the axle and is received in a recess in a spring seat. The clamp group includes the spring seat, a top pad and a plurality of fasteners that connect the top pad, leaf spring, and spring seat to the axle. The leaf spring extends longitudinally and at least forward or rearward relative to the axle, and includes a bore that receives a locator element that extends at least upward or downward from the leaf spring.

29 Claims, 13 Drawing Sheets

(56) References Cited

U.S. PATENT DOCUMENTS

| | | | |
|---|---|---|---|
| 9,108,483 B2 | 8/2015 | Preijert | |
| 11,110,765 B2* | 9/2021 | Peck | B60G 9/003 |
| 2014/0035250 A1* | 2/2014 | Dilworth | B60G 11/04 |
| | | | 280/124.111 |
| 2023/0083976 A1* | 3/2023 | Collyer | B60G 11/113 |
| | | | 267/52 |

FOREIGN PATENT DOCUMENTS

| | | |
|---|---|---|
| EP | 1439081 A1 | 7/2004 |
| WO | 2015005831 A1 | 1/2015 |

* cited by examiner

CLAMP GROUP AND ROUND AXLE WITH ALIGNMENT FEATURES

CROSS-REFERENCE TO RELATED APPLICATION

This application claims the benefit and priority of U.S. Patent Application Ser. No. 63/171,475, filed Apr. 6, 2021, the disclosure of which is hereby incorporated herein by reference in its entirety.

BACKGROUND

Field of the Invention

The present invention generally relates to clamp groups and suspension systems that employ such assemblies for use in vehicles. More particularly, the disclosure presents a clamp group mounting of a leaf spring to a round axle including alignment features.

Discussion of the Prior Art

Wheeled vehicles commonly have suspension systems that that utilize axles and clamp groups to attach an axle to a longitudinally extending suspension component, such as a leaf spring or trailing arm. The suspension component typically is connected at an end to a vehicle frame or directly to a body assembly. For ride quality and efficiency, it is desirable to reduce unsprung weight associated with an axle and the clamp group that mounts the axle to the suspension component.

Truck and other heavy vehicle suspension systems are subjected to substantial forces or loads induced by vehicle acceleration, braking, turning and encountering road obstructions, such as bumps and depressions or shallow holes. The forces are transmitted, for example, from the axle through left side and right side clamp groups, which connect respective leaf springs to the frame or body assembly. In driving under various conditions and over many different surfaces, an axle may encounter numerous inputs that seek to cause the axle to try to move relative to a clamp group, frame or body assembly. The forces typically are in a lateral direction along the axle, or in the radial direction, such as causing rotation of the clamp group about the axle. One key challenge is reacting to the loads generated in the clamp group from cross articulation or roll motion.

Trailing arm suspensions generate auxiliary roll by developing a moment about the axle. During cross articulation or roll motion of the axle, one side of the axle will move upward, while the other side will move downward. For example, in a trailing arm air suspension system, the suspension will pivot about a pivot point at the front of the suspension as it moves through vertical travel. In a cross articulation event, the end of the axle that moves upward will act to twist the axle in a counterclockwise direction, while the end of the axle that moves downward will be twisted in the clockwise direction. Thus, forces may cause the clamp groups to try to translate laterally or rotate about the axle. This presents a challenge to keep the clamp groups firmly mounted in place relative to the axle.

When dealing with a square axle, the flat surfaces provide an advantage of inherently resisting rotation about the axle. With round axles, many prior art installations seek to rigidly connect a spring to the axle by using a heavy welded wrap, with sensitive welded areas requiring high precision, or the use of bulky welded brackets. The tendency of forces to cause an axle coupling to rotate about a round axle can make it particularly difficult to maintain the intended mounted position of a clamp group which seeks to utilize a bolted connection. The bolted connection typically must rely on compression and friction to resist lateral movement along or rotation about the axle. The key challenge in a trailing arm air suspension claim group design is achieving a fixed attachment of the bolted components to the axle and being able to react to the various forces or loads that are transmitted from the axle through the clamp group and ultimately into the frame or body assembly.

The present disclosure addresses shortcomings found in prior art suspension systems that include clamp groups that mount a leaf spring to a round axle.

SUMMARY

This disclosure is directed to a clamp group mounting of a leaf spring to a round axle that includes alignment features. The subject matter includes a locator ring welded to the top of the axle, and a clamp group that is fitted to and benefits from the locator ring by resisting movement laterally and rotationally relative to the axle. The clamp group, leaf spring and round axle bearing the locator ring work together to provide an efficient, relatively light weight, securely mounted assembly, wherein alignment features assist in aligning components during assembly and assist the assembly in effectively handling the forces that otherwise seek to move the spring and clamp group relative to the round axle.

In a first aspect, disclosed herein is a clamp group mounting of a leaf spring to a round axle including alignment features, including a round axle, a leaf spring and a clamp group connecting the leaf spring to the axle. The axle extends laterally and has an arcuate upper surface and arcuate lower surface, while a locator ring having a fish-mouth tapered lower end has the lower end welded to the arcuate upper surface of the axle. The leaf spring extends longitudinally and at least forward or rearward relative to the axle, and has a vertical bore that receives a locator element that extends at least upward or downward from the leaf spring. The clamp group includes a spring seat, top pad and a plurality of fasteners that connect the top pad, leaf spring, and spring seat to the axle. The spring seat further includes a downward facing generally arcuate surface configured to receive the arcuate upper surface of the axle, a recess in the downward facing arcuate surface, wherein the recess receives the locator ring that is welded to the arcuate upper surface of the axle. The spring seat also includes a generally planar upper surface against which the leaf spring is positioned and a recess that receives the locator element extending downward from the leaf spring. The top pad further includes a generally planar lower surface above the leaf spring, and an upper surface that engages the fasteners.

It is to be understood that both the foregoing general description and the following detailed description are exemplary and are provided for purposes of explanation only and are not restrictive to the subject matter claimed. Further features and objects of the present disclosure will become more apparent in the following description of the example embodiments and from the appended claims.

BRIEF DESCRIPTION OF THE DRAWINGS

In describing the preferred examples, reference is made to the accompanying drawing figures wherein like parts have like reference numerals, and wherein.

Figure 1:
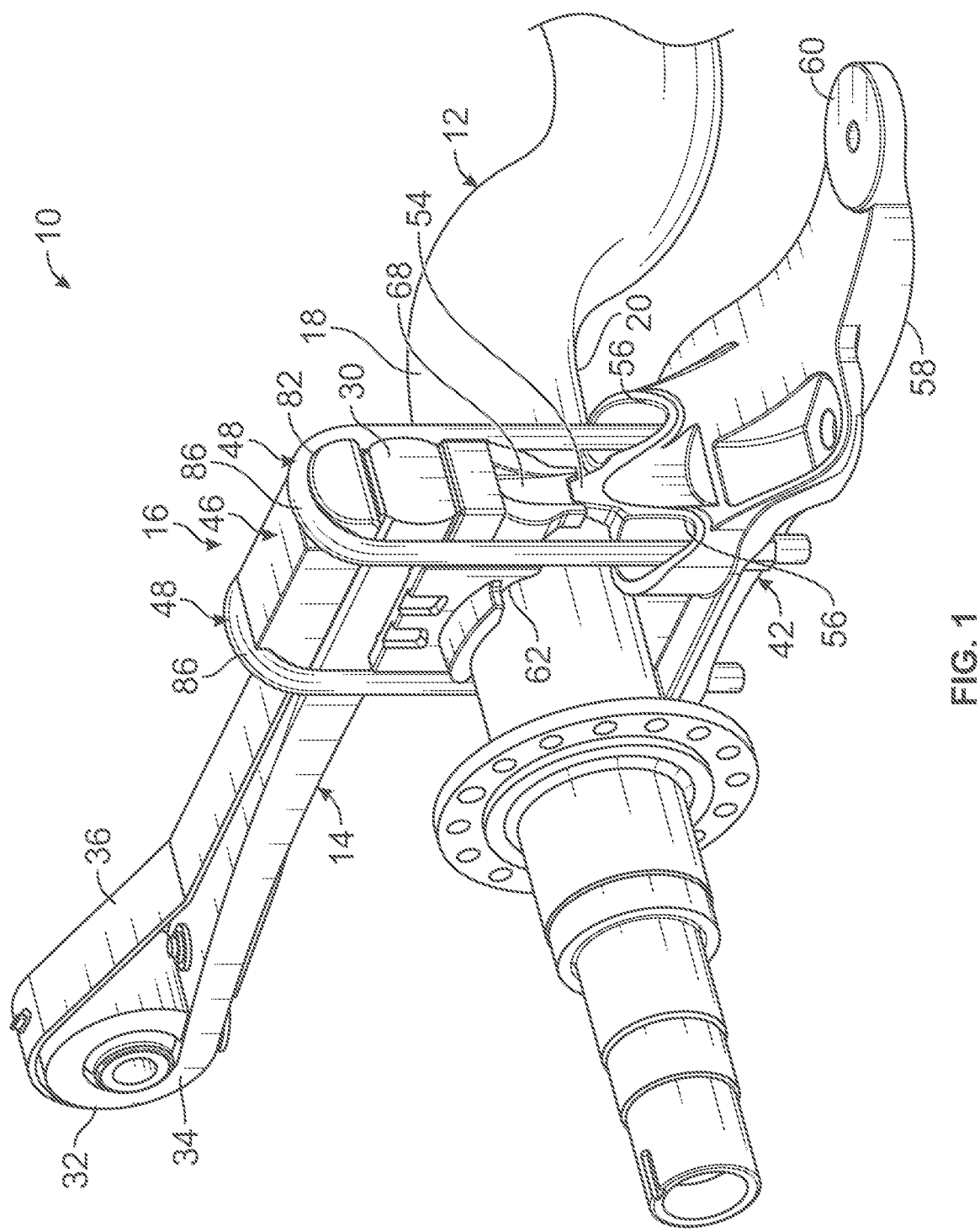
FIG. 1 is an upper rear perspective view of a clamp group mounting of a leaf spring to a round axle including alignment features as a first example of the inventive subject matter, near the left end of the axle.
Figure 2:
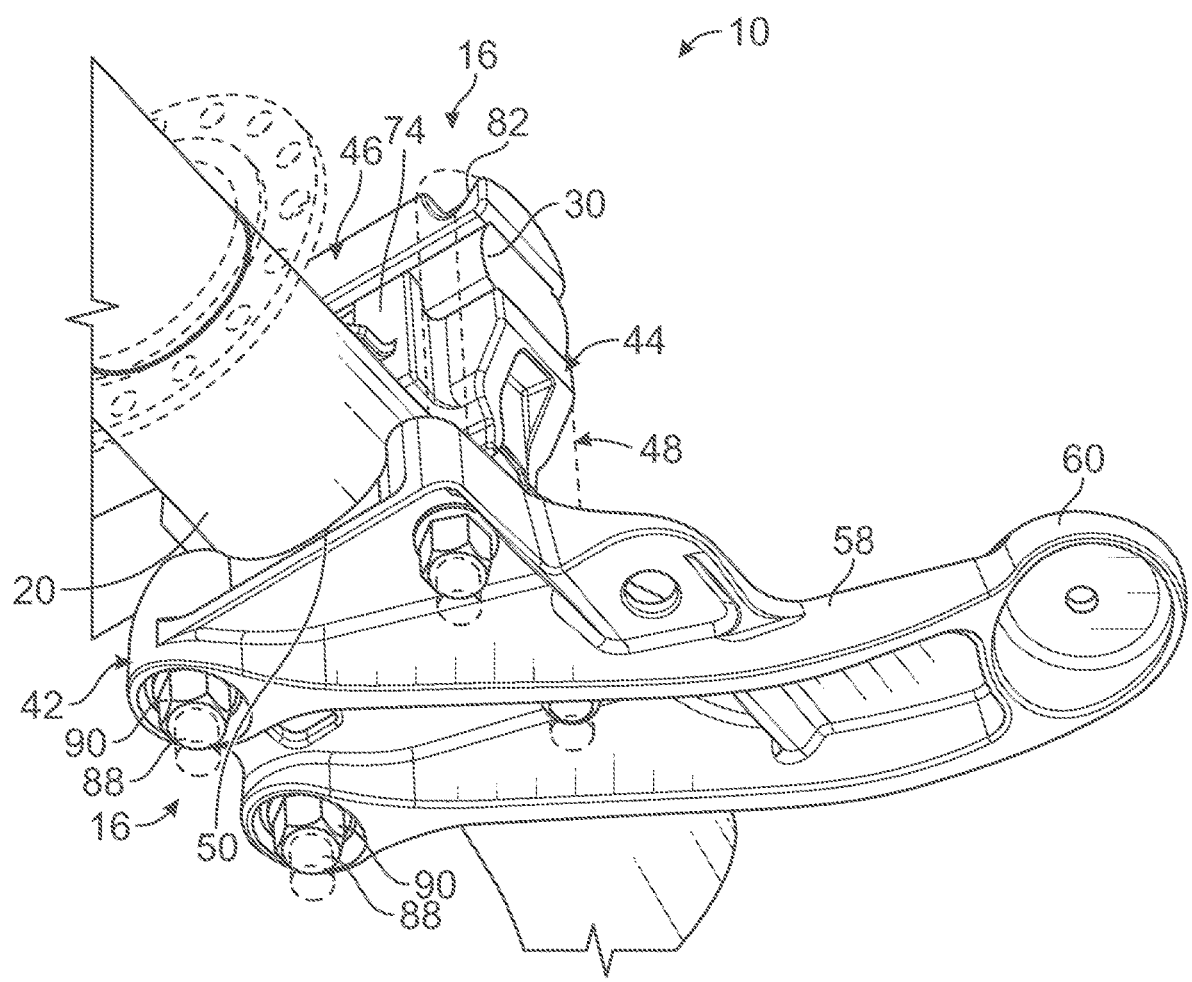
FIG. 2 is a lower rear perspective view of the first example shown in FIG. 1.
Figure 3:
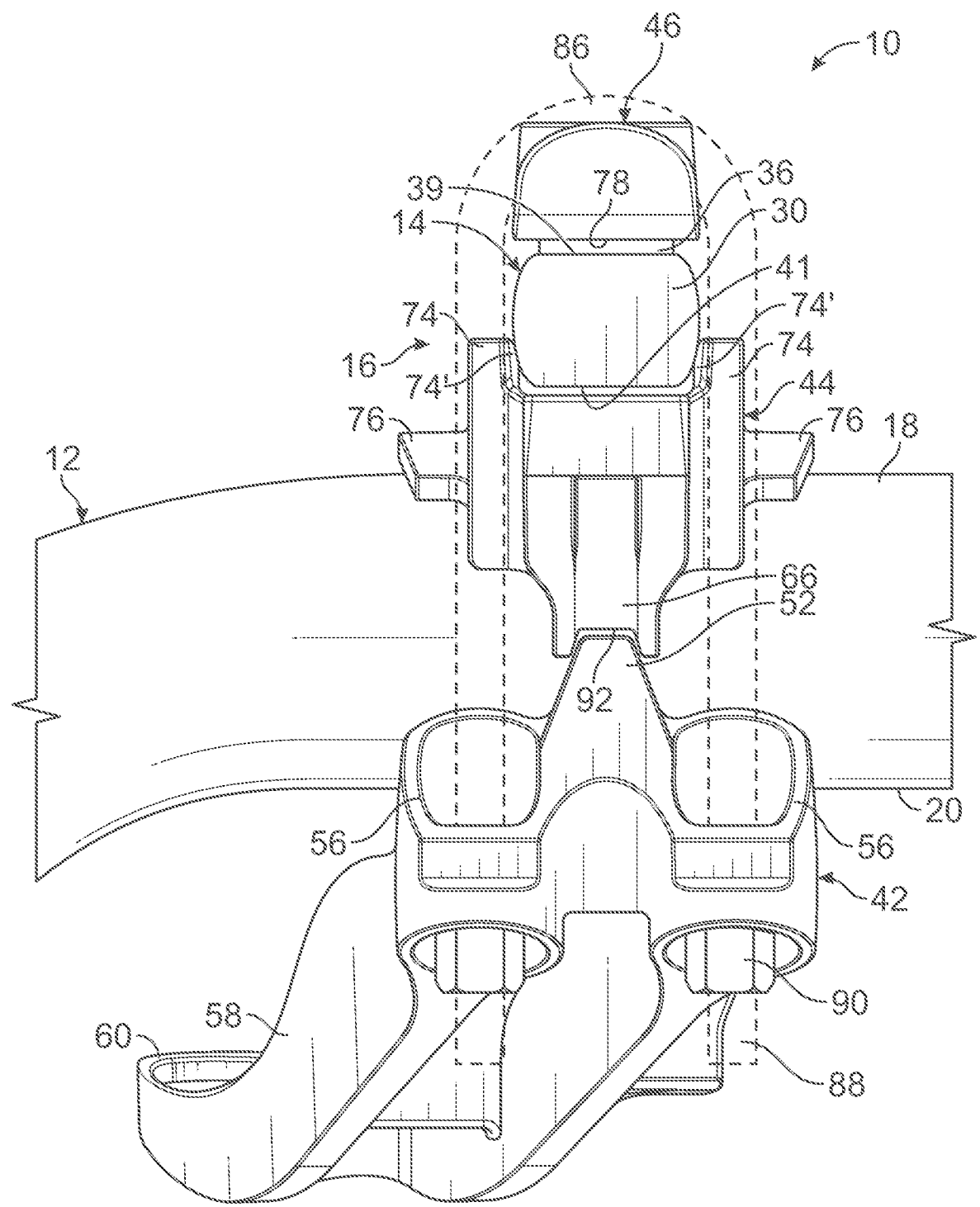
FIG. 3 is a front view of the first example shown in FIGS. 1-2.
Figure 4:
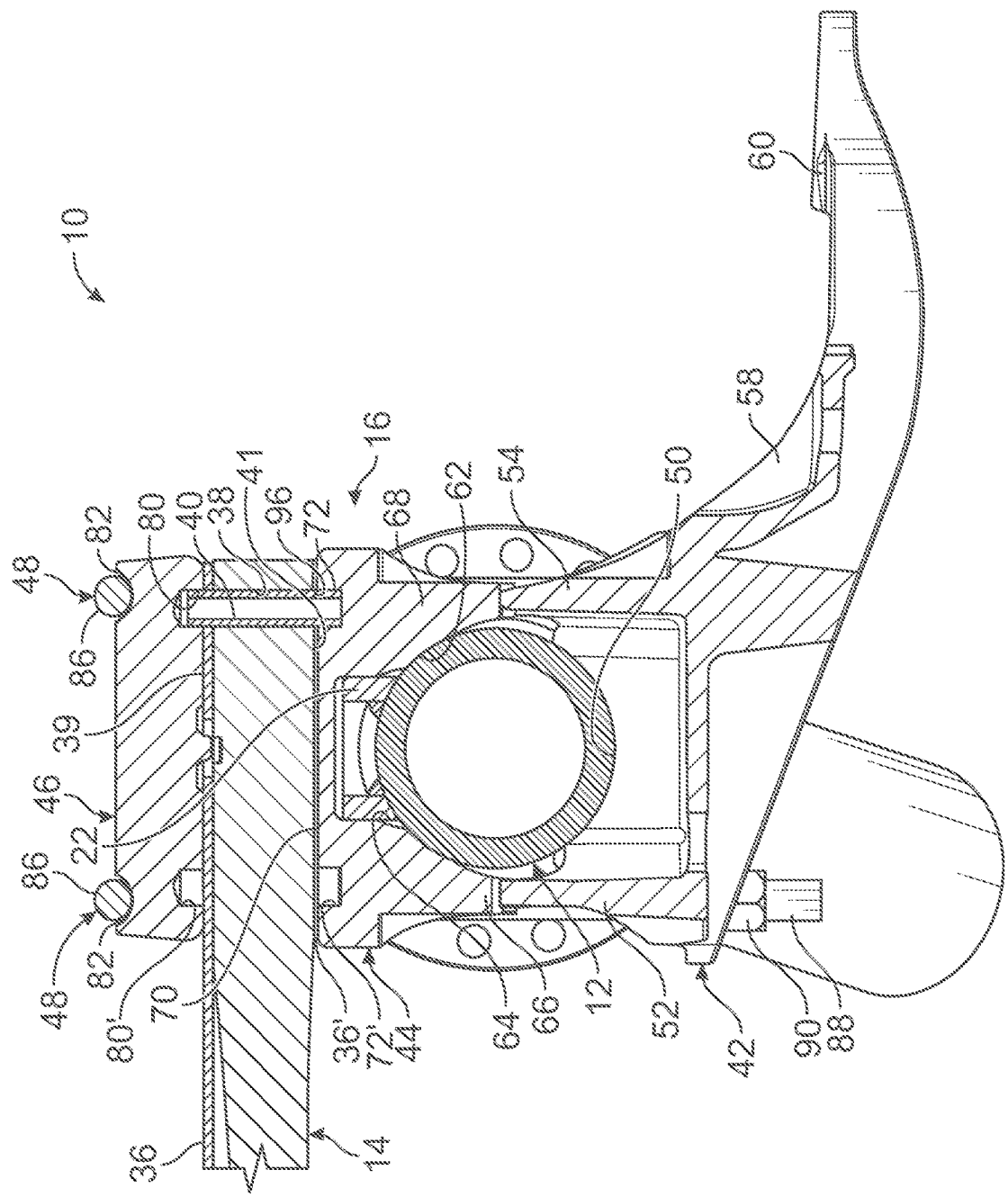
FIG. 4 is a cross-sectional side view of the first example shown in FIGS. 1-3, with the cross-section through the center of the clamp group and the locator ring welded to the upper arcuated surface of the round axle.
Figure 5:
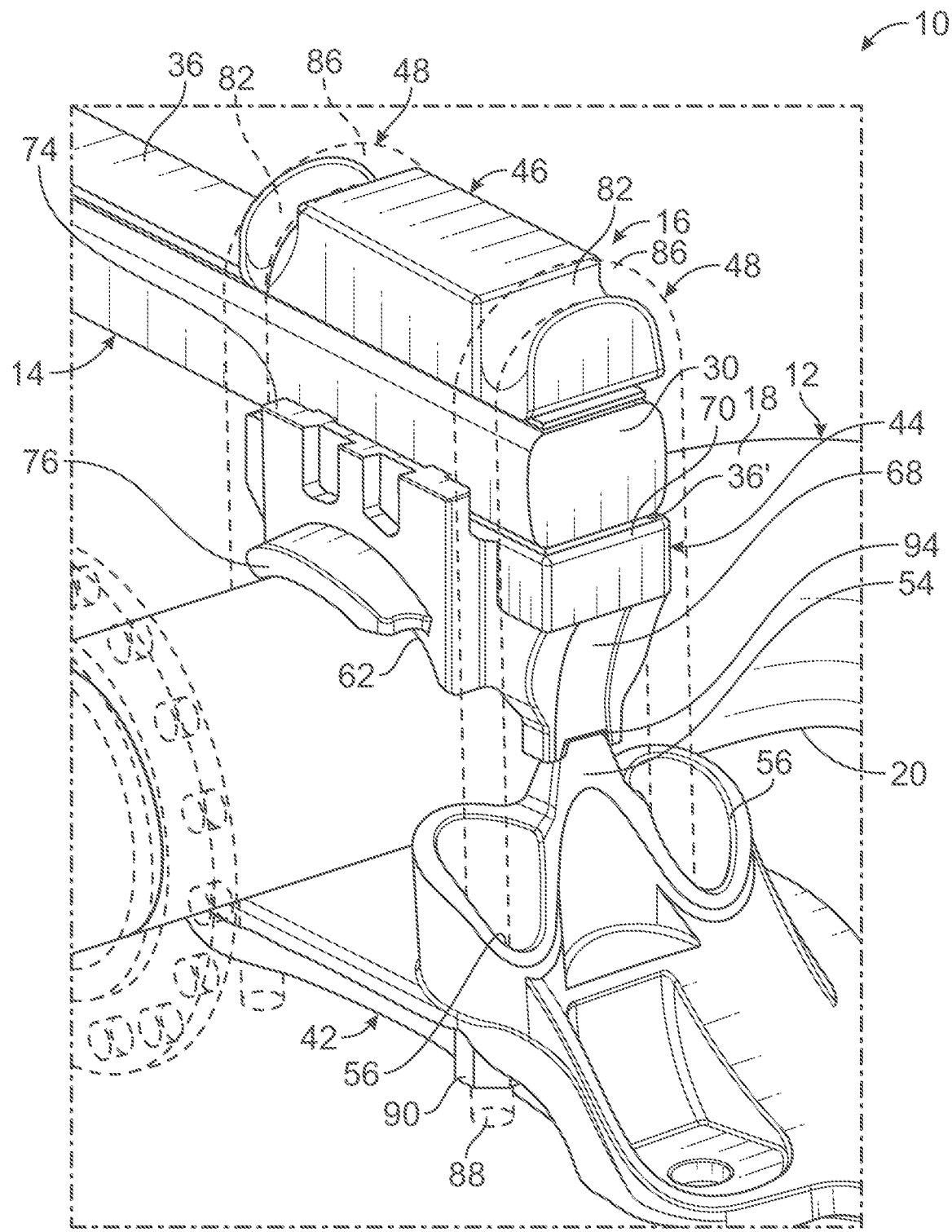
FIG. 5 is an upper rear perspective closer view of the first example shown in FIG. 1.
Figure 6:
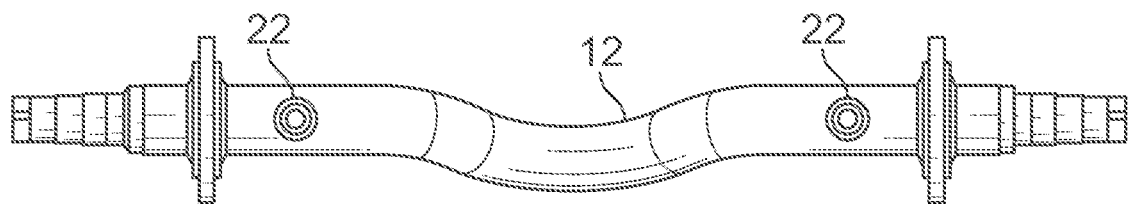
FIG. 6 is a top view of the full axle shown in FIG. 1, which shows the location of locator rings welded to arcuate upper surfaces of the round axle.

It should be understood that the drawings are not to scale. While some mechanical details of a clamp group mounting of a leaf spring to a round axle including alignment features, and other plan and section views of the particular components, have been omitted, such details are considered within the comprehension of those skilled in the art in light of the present disclosure. It also should be understood that the present disclosure is not limited to the examples illustrated.

DETAILED DESCRIPTION

This disclosure presents examples of a clamp group mounting of a leaf spring to a round axle including alignment features, for use in vehicle suspension systems.

Referring to the drawings, a first example embodiment of the claimed subject matter is shown in FIGS. 1-12. The reference numeral 10 generally designates a first example clamp group mounting of a leaf spring to a round axle including alignment features, for use in vehicle suspension systems. For brevity, the assembly also may be referred to herein as clamp group mounting 10. The figures illustrate the first example includes a round axle 12, a leaf spring 14 and a clamp group 16 connecting the leaf spring 14 to the axle 12. In the relative orientation for installation in a vehicle, the axle 12 extends laterally.

Figure 7:
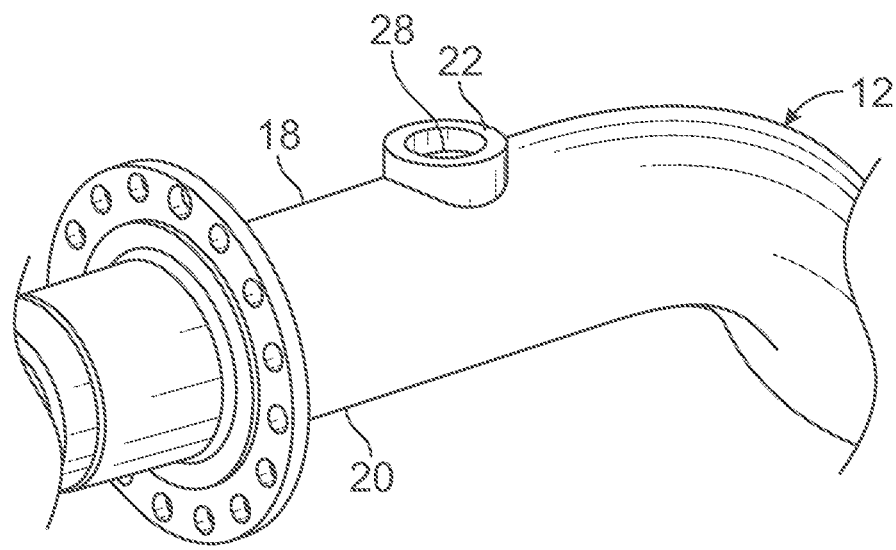
FIG. 7 is an upper rear perspective view of a portion of the left end of the axle of FIGS. 1-6, with a locator ring welded to the upper arcuate surface of the axle.
Figure 8:
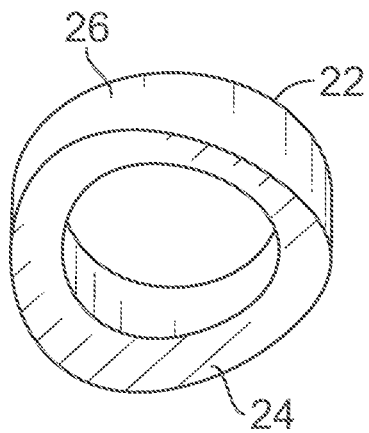
FIG. 8 is a closer lower perspective view of the locator ring shown in FIGS. 4 and 6-7.
Figure 9:
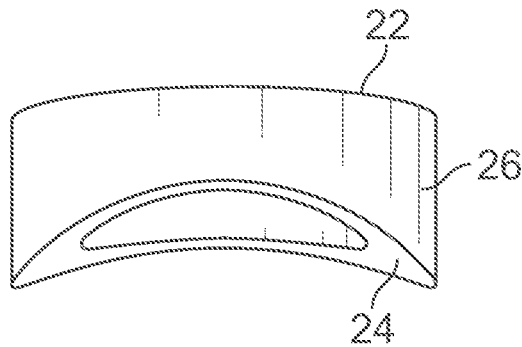
FIG. 9 is a closer side perspective view of the locator ring shown in FIGS. 4 and 6-8.
Figure 10:
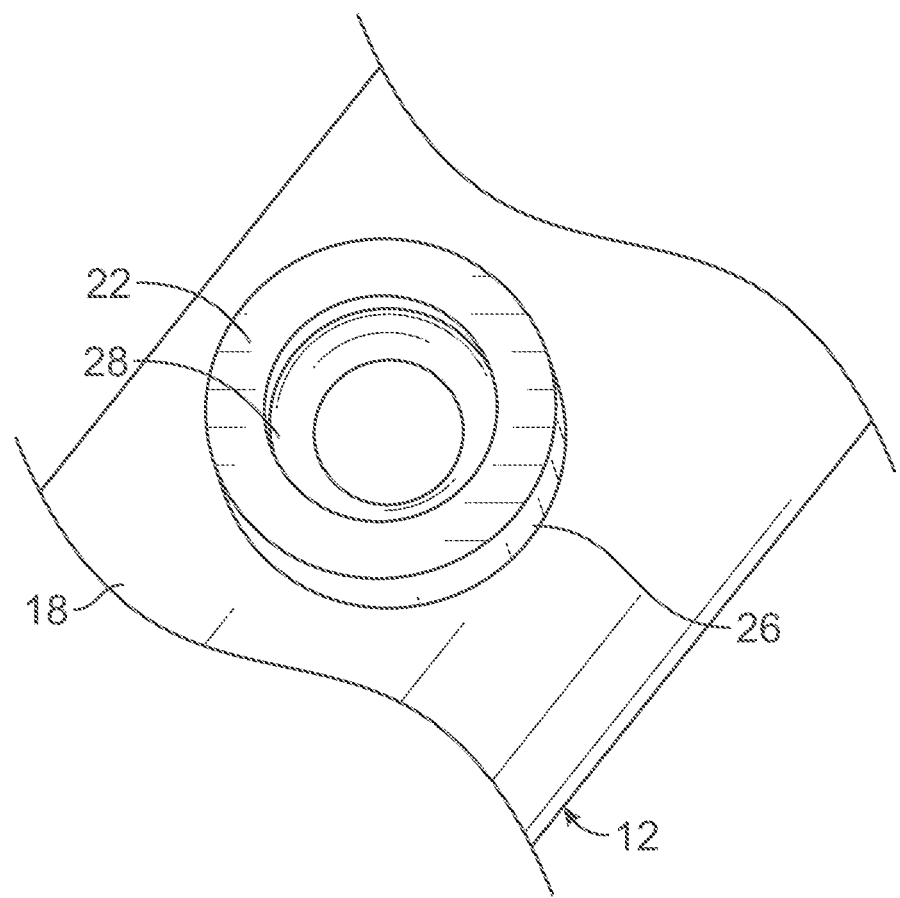
FIG. 10 is an upper perspective view of the locator ring welded to the upper arcuate surface of the axle shown in FIG. 7, showing the weld to the axle being located within the locator ring.
Figure 11:
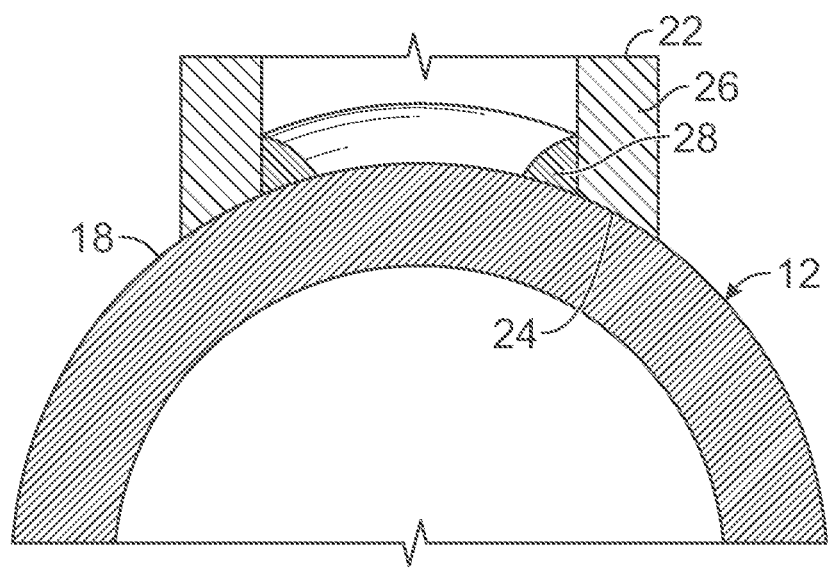
FIG. 11 is a closer cross-sectional view of the locator ring welded to the upper arcuate surface of the axle shown in FIGS. 7 and 10, showing the weld to the axle being located within the locator ring.
Figure 12:
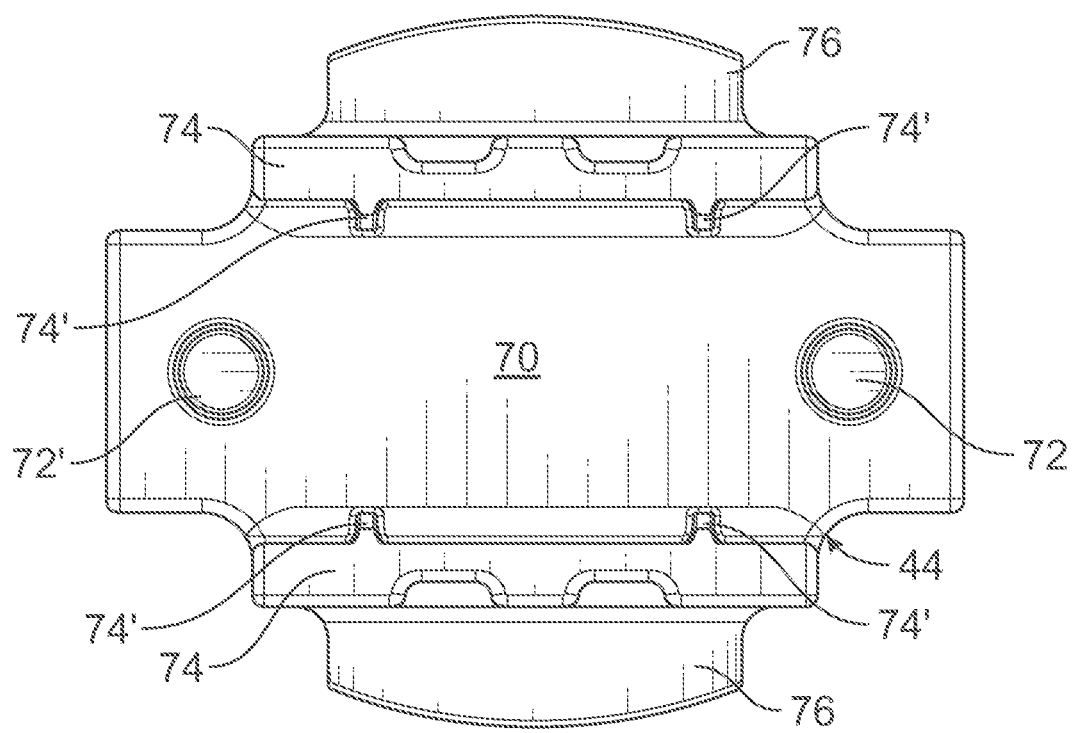
FIG. 12 is a top view of the axle seat shown in FIGS. 1-5, which shows the laterally spaced apart upward extensions of the spring seat further including inward extending projections that engage the leaf spring.

As may be seen in FIGS. 1 and 7, the axle 12 is round, and therefore, has an arcuate upper surface 18 and arcuate lower surface 20. A locator ring 22 has a fish-mouth tapered lower end 24, which is best seen in FIGS. 8-9, and results in the locator ring 22 following the contour of the upper arcuate surface 20. The locator ring 22 has an upstanding side wall 26 and in this example, is cylindrical, but other shapes may be utilized. As best seen in FIGS. 10-11, the locator ring 22 is open from above, providing access to form a weld 28 between the locator ring 22 and the upper arcuate surface 18 of the axle 12, which is located inside the locator ring 22. This along with the fish-mouth tapered lower end 24 results in a strong weld 28 that extends around the inside of the locator ring 22. The interior weld 28 yields a clean, unobstructed outer periphery of the locator ring 22 and axle 12 for consistent assembly to the clamp group 16.

As may be seen in FIG. 1, the first example leaf spring 14 is a half leaf spring that extends longitudinally and forward relative to the axle 12. However, it will be appreciated that a leaf spring will extend from the axle at least forward or rearward, such as when using a half leaf spring, or may extend in both directions, as when using a full leaf spring. The example leaf spring 14 has a rear end 30 connected to the clamp group 16. The leaf spring 14 extends forward to a front end 32 having an eye 34 that may be connected to a bracket that would be fixedly attached to the vehicle frame or body. In this example, a leaf spring retainer 36 is constructed as a band that is configured to wrap around and capture the leaf spring 14, in the event the spring is fractured. The rear end 30 of the example leaf spring 14 also includes a vertical bore 38 therethrough. The bore 38 receives a locator element 40. In this example, the locator element 40 is a pin that extends upward from an upper surface 39 of the leaf spring 14 and downward from a lower surface 41 of the leaf spring 14. For ease of assembly, the pin 40 may be, for example, a roll pin.

In the first example, the clamp group 16 includes a lower clamp 42, spring seat 44, top pad 46 and a plurality of fasteners 48 that connect the top pad 46, leaf spring 14, spring seat 44 and lower clamp 42 to the axle 12. The lower clamp 42 includes an upward facing generally arcuate surface 50 configured to receive the arcuate lower surface 20 of the axle 12, at least one upward extending alignment locator 52 positioned forward of the upward facing generally arcuate surface 50 and at least one upward extending alignment locator 54 positioned rearward of the upward facing generally arcuate surface 50, and a plurality of apertures 56 through the lower clamp 42. In this example, the lower clamp 42 also has a rearward extension 58 that includes an air spring seat 60.

The spring seat 44 of the first example clamp group 16 includes a downward facing generally arcuate surface 62 configured to receive the arcuate upper surface 18 of the axle 12 and having a recess 64. The recess 64 receives the locator ring 22 that is welded to the arcuate upper surface 18 of the axle 12. The spring seat 44 includes at least one downward extending alignment locator 66 positioned forward of the downward facing generally arcuate surface 62 and vertically aligned with the upward extending alignment locator 52 of the lower clamp 42 positioned forward of the upward facing generally arcuate surface 50, and at least one downward extending alignment locator 68 positioned rearward of the downward facing generally arcuate surface 62 and vertically aligned with the upward extending alignment locator 54 of the lower clamp 42 positioned rearward of the of the upward facing generally arcuate surface 50. The spring seat 44 further includes a generally planar upper surface 70 against which the leaf spring 14 is positioned and which further includes a recess 72 that receives the locator element 40 extending downward from the lower surface 41 the leaf spring 14.

The recess 64 in the spring seat 44 that receives the locator ring 22 preferably is shaped and sized to provide a close fit relative to the locator ring 22. In this example, the recess 64 is cylindrical and has a diameter slightly larger than the diameter of the locator ring 22. The recess 64 is deeper than the height of the side wall 26 of the locator ring 22. The shape and sizing of the recess 64 relative to the locator ring 22 facilitate quick location and assembly of the spring seat 44 to the axle 12. The close fit also limits lateral and radial or rotational movement of the spring seat 44, and therefore, the clamp group 16, relative to the axle 12.

In addition, the spring seat 44 of the first example preferably includes laterally spaced apart upward extensions 74, between which is located the generally planar surface 70 against which the leaf sprint 14 is positioned. As may be seen in FIG. 12, the upward extensions 74 further include inward extending projections 74' that engage the leaf spring 14. The inward extending projections 74' of the spring seat 44 are deformed as the clamp group 16 is connected to the axle 12 and assist in locating and retaining the rear end 30 of the leaf spring 14. Still further, the downward facing generally arcuate surface 62 of the spring seat 44 preferably includes lateral extensions 76. The lateral extensions 76 provide a broader generally arcuate surface, which enhances stability of the spring seat 44 atop the axle 12.

The top pad 46 of this example includes a generally planar lower surface 78. The generally planar lower surface 78 includes a recess 80 that receives the locator element 40 extending upward from an upper surface 39 of the leaf spring 14. The top pad 46 also includes an upper surface 82 that engages the fasteners 48. In this example, each of the plurality of fasteners 48 includes a U-shaped bolt 84 having a head 86 and threaded legs 88. The threaded legs 88 of the U-shaped bolts 84 are received by the plurality of apertures 56 through the lower clamp 42, and receive respective threaded nuts 90. In turn, the top pad upper surface 82 that engages the plurality of fasteners 48 includes contoured surfaces in the form of saddles that receive the heads 86 of the U-shaped bolts 84. It will be appreciated that upon installing the nuts 90 on the threaded legs 88, the U-shaped bolts 84 are used to draw together the clamp group 16, leaf spring 14 and axle 12.

The front and rear alignment locators of the lower clamp 42 and spring seat 44 provide particular benefits. The downward extending alignment locators 66, 68 of the spring seat 44 are configured to block lateral movement of the spring seat 44 relative to the vertically aligned upward extending alignment locators 52, 54 of the lower clamp 42. In the present example, the downward extending alignment locators 66, 68 of the spring seat 44 include respective channels 92, 94 that receive the vertically aligned upward extending alignment locators 52, 54 of the lower clamp 42. It will be appreciated that the configurations of the alignment locators could be reversed or modified to otherwise resist relative lateral movement.

In the configuration shown, the downward extending alignment locators 66, 68 of the spring seat 44 and the vertically aligned upward extending alignment locators 52, 54 of the lower clamp 42 are shaped and sized to avoid simultaneous contact forward and rearward of the axle 12. Thus, when assembling the clamp group 16 and leaf spring 14 to the axle 12, as the fasteners 48 are installed and tightened, the spring seat 44 and lower clamp 42 move toward each other and apply compressive force to the axle 12. The locator ring 22 holds the spring seat 44 in place laterally and with respect to not permitting any rotation of the spring seat 44 about the axle 12. Therefore, as the nuts 90 are rotated about the threaded legs 88 of the U-shaped bolts 84 to install the clamp group 16, depending on which nut is tightened first, the lower clamp 42 may tilt slightly until there is contact between the front vertically aligned upward extending alignment locator 52 of the lower clamp 42 and the downward extending alignment locator 66 of the spring seat 44, while leaving a gap between rear vertically aligned upward extending alignment locator 54 of the lower clamp 42 and the downward extending alignment locator 68 of the spring seat 44. Alternatively, the lower clamp 42 may tilt slightly until there is contact between the rear vertically aligned upward extending alignment locator 54 of the lower clamp 42 and the downward extending alignment locator 68 of the spring seat 44, while leaving a gap between front vertically aligned upward extending alignment locator 52 of the lower clamp 42 and the downward extending alignment locator 66 of the spring seat 44. Once all of the nuts 90 are tightened, the lower clamp 42 may reverse the initial tilting to contact the opposite vertically aligned locators or may stop in a location where there is a slight gap between both the front and rear vertically aligned locators.

Given that the recess 64 in the spring seat 44 receives the locator ring 22 welded to the axle 12, the spring seat 44 effectively will not move laterally relative to the axle 12. In turn, the vertically aligned locators collectively will provide resistance to lateral movement of the lower clamp 42 relative to the spring seat 44, regardless of whether they transmit compressive force. In addition, the further combination of the locating features within the spring seat 44, leaf spring 14 and top pad 46, along with the fasteners 48, provide resistance to lateral movement of the remainder of the clamp group 16 and leaf spring 14 relative to the axle 12. The interactions also resist radial or rotational movement of the respective components relative to the axle 12.

Within the clamp group 16, it will be appreciated that the leaf spring retainer 36 is located between the top pad 46 and the leaf spring 14. This occurs above and below the leaf spring 14. As such, the lower rear end of the leaf spring retainer 36 includes an aperture 96 through which extends the locator element 40 in the form of the roll pin. The upper rear end of the leaf spring retainer 36 includes an aperture 98. The generally planar lower surface 78 of the top pad 46 further includes a downward projection 100, which is received by the aperture 98 through the leaf spring retainer 36. In the event of a fractured leaf spring 14, this assembly seeks to ensure that the clamp group 16 and leaf spring retainer 36 will retain the pieces of the leaf spring 14.

Another advantage of the first example assembly includes that the spring seat 44 and top pad 46 are configured to be reversibly mounted with respect to forward and rearward directions. In this way, the two components may also be deemed even handed, because they may be installed in a right hand or left hand clamp group. This is intended to simplify installation and avoid installation errors that may be inherent with structures that are right or left handed, or that require a forward or rearward orientation. Thus, the top pad 46 of this example includes a second recess 80' in the generally planar lower surface 78, which is capable of receiving the locator element 40 extending upward from the upper surface 39 of the leaf spring 14, if the top pad 46 is reversed during installation. In turn, the spring seat 44 further includes a second recess 72' in the generally planar upper surface 70, which is capable of receiving the locator element 40 extending downward from the lower surface 41 of the leaf spring 14, if the spring seat 44 is reversed during installation. The downward projection 100 of the top pad is centered, as is the recess 64 in the spring seat 44 that receives the locator ring 22, also permitting reversible installation.

In a further advantage of the assembly, the locator ring 22 is a relatively small, lightweight part that requires a smaller amount of welding and in a less sensitive area than with the prior art use of heavy welded wraps on axles. Use of the locator ring 22 also may replace a shimming or machining operation needed to adjust a clamp group for different pinion angles, such as for use on drive axles. Instead of shimming or machining both the top pad and the spring seat for a pinion angle change, the location of the locator ring could be moved about the circumference of the axle to change the established angle of the spring seat.

In the first example shown, as noted above, the recess 64 is deeper than the height of the side wall 26 of the locator ring 22. By design, this causes the downward compressive load of the spring seat 44 generated by the clamp group fasteners 48 to be applied by the downward facing generally arcuate surface 62 on the arcuate upper surface 18 of the round axle 12. Contrary to prior art assemblies that rely only on friction from the compressive load to resist rotation of a clamp group about a round axle, in the present example, the locator ring 22 plays an integral role in helping to resist rotation of the clamp group 16 about the round axle 12. It will be appreciated in FIG. 11 that the locator ring 22 resists shear load applied by the spring seat 44 based both on the weld 28 and on the geometry of the interface between the fish-mouth tapered lower end 24 of the locator ring 22 and the round axle 12. As is apparent in FIG. 11, if a rearward load is applied to the locator ring 22, the locator ring 22 would have to physically be forced to ride up and over the upper arcuate surface 18 of the round axle 12. Thus, the weld 28 resists shear load directly, while also holding the locator ring 22 down to the axle 12, thereby taking advantage of this further geometric interface to gain further resistance to shear. Still further, while the height of the locator ring 22 could be tall enough to cause vertical engagement with the top of the recess 64 and that downward force would be applied by the spring seat 44, it is believed that such downward force is not needed and that the lack of such engagement facilitates ease of installation of the spring seat 14 as the recess 64 receives the locator ring 22 on the axle 12.

With respect to materials, it will be appreciated that conventional materials may be used. For example, the lower clamp 42, spring seat 44 and top pad 46 preferably are constructed of cast iron or steel. The locator ring 22 preferably is constructed of extruded steel tubing that is compatible for welding to the axle 12. It will be appreciated that other suitable materials, configurations, methods of construction and fastening may be used for the clamp group mounting.

Stated more broadly, the first example 10 of a clamp group mounting of a leaf spring to a round axle including alignment features, includes a round axle 12, a leaf spring 14 and a clamp group 16 connecting the leaf spring 14 to the axle 12. The axle 12 extends laterally and has an arcuate upper surface 18 and arcuate lower surface 20. A locator ring 22 has a fish-mouth tapered lower end 24, and has the lower end 24 welded to the arcuate upper surface 18 of the axle 12. The leaf spring 14 extends longitudinally and at least forward or rearward relative to the axle 12, and further includes a bore 38 that receives a locator element 40 that extends at least upward or downward from the leaf spring 14. The clamp group 16 further includes at least a spring seat 44, top pad 46 and a plurality of fasteners 48 that connect the top pad 46, leaf spring 14, and spring seat 44 to the axle 12. The spring seat 44 further includes a downward facing generally arcuate surface 62 configured to receive the arcuate upper surface 18 of the axle 12, a recess 64 in the downward facing arcuate surface 62, and the recess 64 receives the locator ring 22 that is welded to the arcuate upper surface 18 of the axle. The spring seat 44 also includes a generally planar upper surface 70 above which the leaf spring 14 is positioned. The top pad 46 further includes a generally planar lower surface 78 above the leaf spring 14 and an upper surface 82 that engages the fasteners 48.

Turning to FIGS. 13-16, a second example 110 of a clamp group mounting of a leaf spring to a round axle including alignment features, includes a round axle 12, a leaf spring 114 and a clamp group 116 connecting the leaf spring 114 to the axle 12. While it will be appreciated that the clamp groups of the examples herein could be connected to other axle configurations, for convenience in this disclosure, the axle 12 is the same as previously described with respect to the first example. Thus, the axle 12 extends laterally and has an arcuate upper surface 18 and arcuate lower surface 20. As seen in FIGS. 6-11, a locator ring 22 has a fish-mouth tapered lower end 24, and has the lower end 24 welded to the arcuate upper surface 18 of the axle 12. The leaf spring 114 extends longitudinally and at least forward or rearward relative to the axle 12, and further includes a bore 138 that receives a locator element 140 that extends at least upward or downward from the leaf spring 114. The clamp group 116 further includes at least a spring seat 144, top pad 146 and a plurality of fasteners 148 that connect the top pad 146, leaf spring 114, and spring seat 144 to the axle 12.

The spring seat 144 further includes a downward facing generally arcuate surface 162 configured to receive the arcuate upper surface 18 of the axle 12, a recess 164 in the downward facing arcuate surface 162, and the recess 164 receives the locator ring 22 that is welded to the arcuate upper surface 18 of the axle. The spring seat 144 also includes a generally planar upper surface 170 above which the leaf spring 114 is positioned and which further includes a recess 172 that receives the locator element 140 extending downward from the lower surface 141 of the leaf spring 114. The top pad 146 further includes a generally planar lower surface 178 above the leaf spring 114 and an upper surface 182 that engages the fasteners 148.

Figure 13:
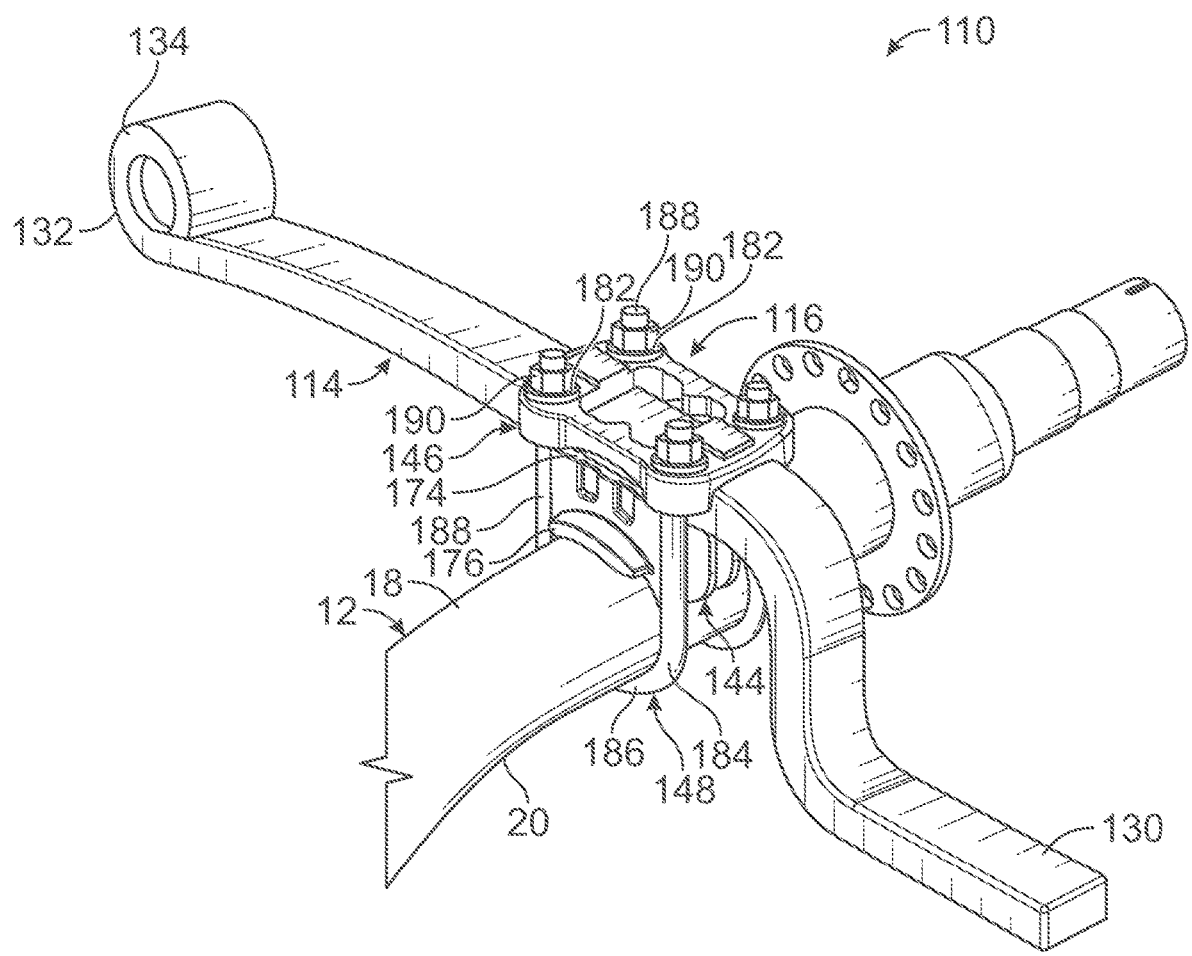
FIG. 13 is an upper rear perspective view of a clamp group mounting of a leaf spring to a round axle including alignment features as a second example of the inventive subject matter, near the right end of the axle.
Figure 14:
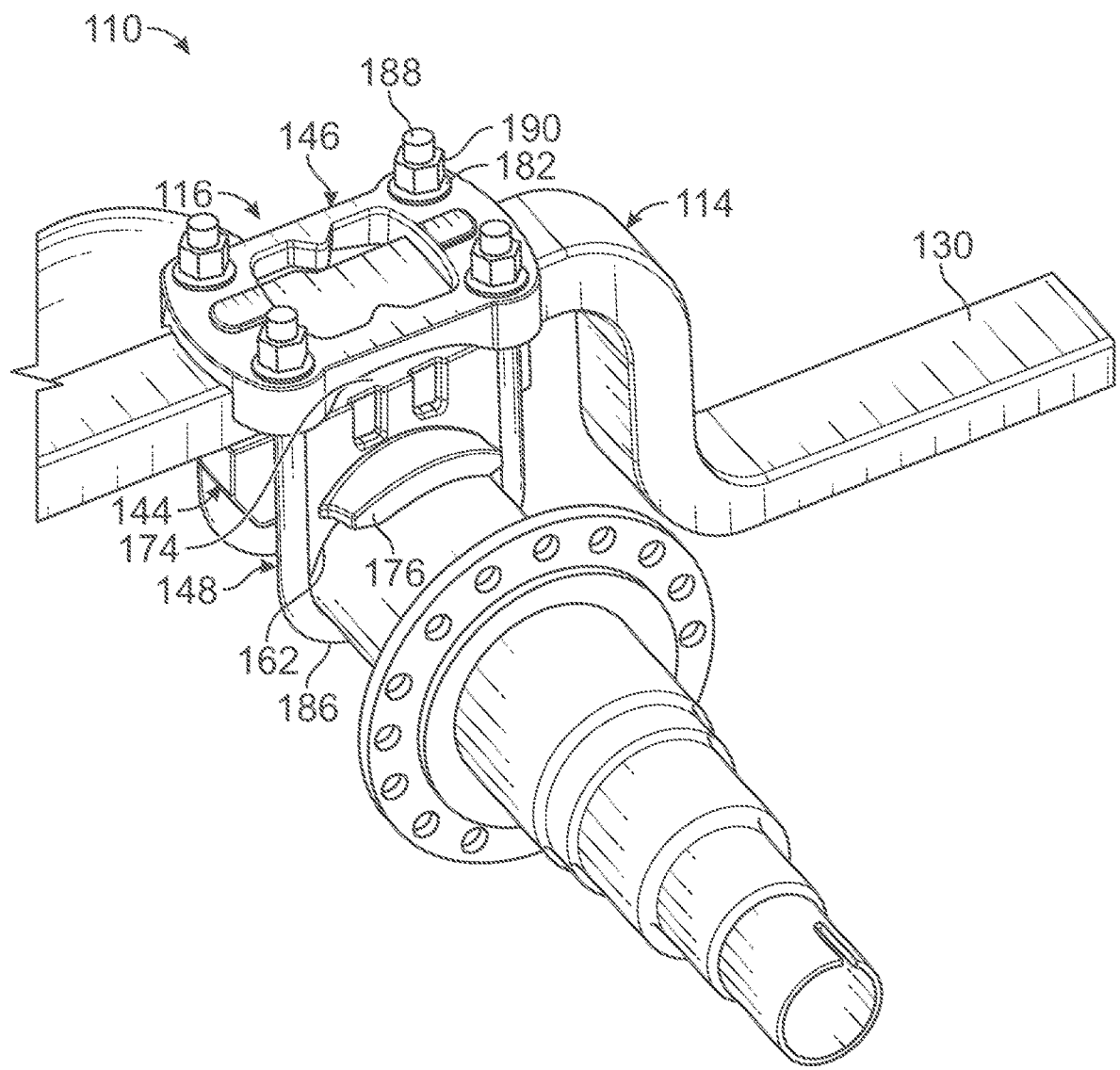
FIG. 14 is an upper front perspective view of a clamp group mounting of a leaf spring to a round axle of the second example shown in FIG. 13, near the left end of the axle.
Figure 16:
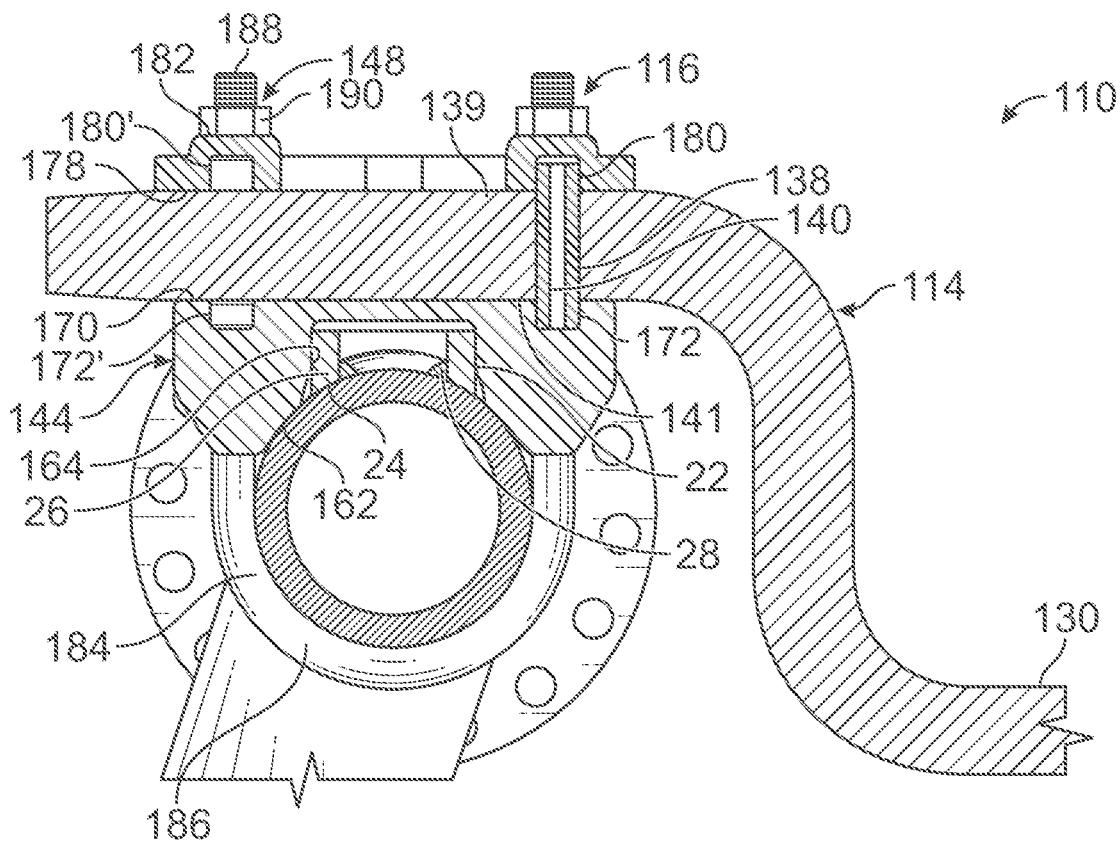
FIG. 16 is a cross-sectional side view of the second example shown in FIGS. 13-15, with the cross-section through the center of the clamp group and the locator ring welded to the upper arcuated surface of the round axle, and having a locator element extending upward and downward from the leaf spring.

As may be seen in FIG. 13, the second example leaf spring 114 extends longitudinally forward and rearward relative to the axle 12. As noted previously, it will be appreciated that a leaf spring will extend from the axle 12 at least forward or rearward, such as when using a half leaf spring, or may extend in both directions, such as in this example where the rear end 130 of the leaf spring 114 may provide, for example, an air spring seat. The leaf spring 114 extends forward to a front end 132 having an eye 134 that may be connected to a bracket that would be fixedly attached to the vehicle frame or body. The second example does not show use of a leaf spring retainer, a liner beneath the leaf spring or a bushing within the eye 134. It will be appreciated that any and all of these features are optional and may be used if desired. As shown in FIG. 16, this particular example leaf spring 114 includes a vertical bore 138, which extends all the way through the leaf spring 114. As previously noted, the bore 138 receives a locator element 140 and in this example, the locator element 140 is a pin that extends upward and downward from the leaf spring 114. As in the first example, for ease of assembly, the pin 140 may be, for example, a roll pin.

Similarly to the first example, the recess 164 in the spring seat 144 of the second example that receives the locator ring 22 preferably is shaped and sized to provide a close fit relative to the locator ring 22. In this example, the recess 164 is cylindrical and has a diameter slightly larger than the diameter of the locator ring 22. The recess 164 is deeper than the height of the side wall 26 of the locator ring 22. The shape and sizing of the recess 164 relative to the locator ring 22 facilitate quick location and assembly of the spring seat 144 to the axle 12. The close fit also limits lateral and radial or rotational movement of the spring seat 144, and therefore, the clamp group 116, relative to the axle 12.

Figure 15:
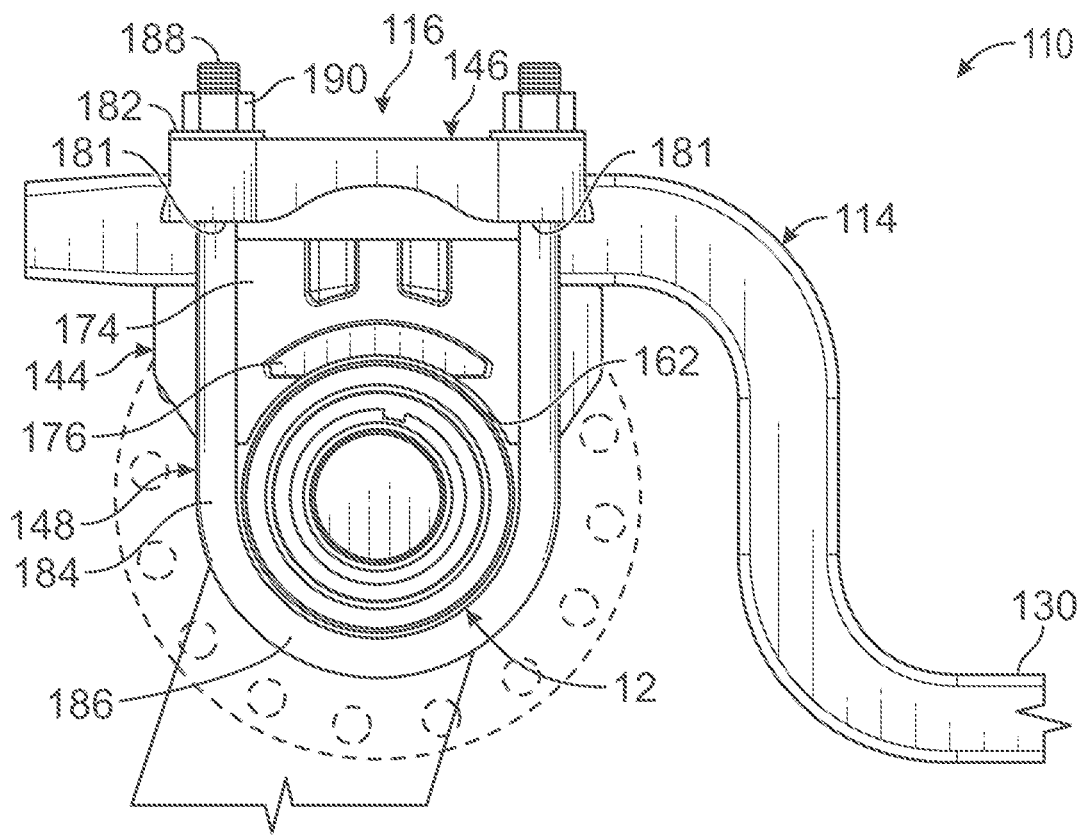
FIG. 15 is a side view of the second example shown in FIGS. 13-14.
Figure 19:
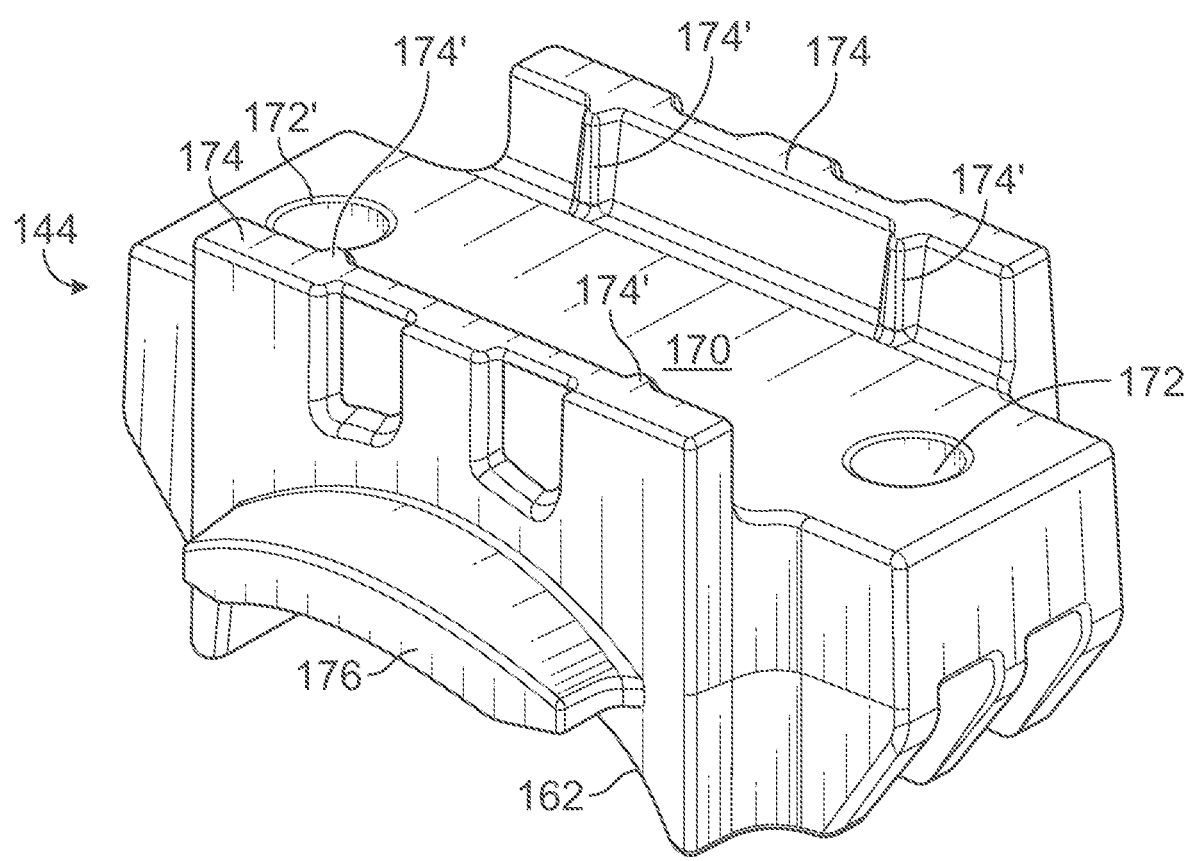
FIG. 19 is an upper perspective view of the axle seat shown in FIGS. 13-16, which shows the laterally spaced apart upward extensions of the spring seat of the second example further including inward extending projections that engage the leaf spring.

In addition, similarly to the first example and as seen in FIGS. 15 and 19, the spring seat 144 of the second example preferably includes laterally spaced apart upward extensions 174, between which is located the generally planar surface 170 above and against which the leaf sprint 114 is positioned. As may be seen in FIG. 19, the upward extensions 174 further include inward extending projections 174' that engage the leaf spring 114. The inward extending projections 174' of the spring seat 144 are deformed as the clamp group 116 is connected to the axle 12 and assist in locating and retaining the leaf spring 114 within the spring seat 144. Still further, the downward facing generally arcuate surface 162 of the spring seat 144 preferably includes lateral extensions 176. The lateral extensions 176 provide a broader generally arcuate surface, which enhances stability of the spring seat 144 atop the axle 12.

The top pad 146 of the second example includes a generally planar lower surface 178. The generally planar lower surface 178 includes a recess 180 that receives the locator element 140 extending upward from the upper surface 139 of the leaf spring 114. The top pad 146 includes a plurality of apertures 181 through which the threaded legs 188 of the fasteners 148 extend and an upper surface 182 that engages the nuts 190 of the fasteners 148. In this example, each of the plurality of fasteners 148 includes a U-shaped bolt 184 having a head 186 and threaded legs 188 that receive threaded nuts 190. It will be appreciated that the lower arcuate surface 20 of the axle 12 receives the heads 186 of the inverted U-shaped bolts 184, such that the threaded legs 188 extend upward to and through the plurality of apertures 181 through the top pad 146. The contoured upper surface 182 in this example includes areas that engage the nuts 190. It will be appreciated that upon installing the nuts 190 of the fasteners 148 on the threaded legs 188, the U-shaped bolts 184 are used to draw together the clamp group 116, leaf spring 114 and axle 12.

In the second example configuration shown, when assembling the clamp group 116 and leaf spring 114 to the axle 12, as the fasteners 148 are installed and tightened, the top pad 146, leaf spring 114, spring seat 144 and axle 12 move toward each other and apply compressive force to the axle 12. The locator ring 22 holds the spring seat 144 in place laterally and with respect to not permitting any rotation of the spring seat 144 about the axle 12. Therefore, as the nuts 190 are rotated about the threaded legs 188 of the U-shaped bolts 184 to install the clamp group 116, the projections 174' are deformed to more securely hold the leaf spring 114 in the spring seat 144.

Given that the recess 164 in the spring seat 144 receives the locator ring 22 welded to the axle 12, the spring seat 144 effectively will not move laterally relative to the axle 12. In addition, the further combination of the locating features within the spring seat 144, leaf spring 114 and top pad 146, along with the fasteners 148, provide resistance to lateral movement of the remainder of the clamp group 116 and leaf spring 114 relative to the axle 12. The interactions also resist radial or rotational movement of the respective components relative to the axle 12.

Similarly to the first example, another advantage of the second example assembly includes that the spring seat 144 and top pad 146 are configured to be reversibly mounted with respect to forward and rearward directions. In this way, the two components may also be deemed even handed, because they may be installed in a right hand or left hand clamp group. This is intended to simplify installation and avoid installation errors that may be inherent with structures that are right or left handed, or that require a forward or rearward orientation. Thus, the top pad 146 of this example includes a second recess 180' in the generally planar lower surface 178, which is capable of receiving the locator element 140 extending upward from the leaf spring 114, if the top pad 146 is reversed during installation. In turn, the spring seat 144 further includes a second recess 172' in the generally planar upper surface 170, which is capable of receiving the locator element 140 extending downward from the leaf spring 114, if the spring seat 144 is reversed during installation.

As noted with respect to the first example, there are further advantages in using the locator ring 22 on the axle 12 and with spring seats in the configurations shown in the first and second examples. As described previously, the locator ring 22 plays an integral role in helping to resist rotation of the clamp group 116 about the round axle 12, while also resisting shear load applied by the spring seat 144 based both on the weld 28 and on the geometry of the interface between the fish-mouth tapered lower end 24 of the locator ring 22 and the round axle 12.

Figure 17:
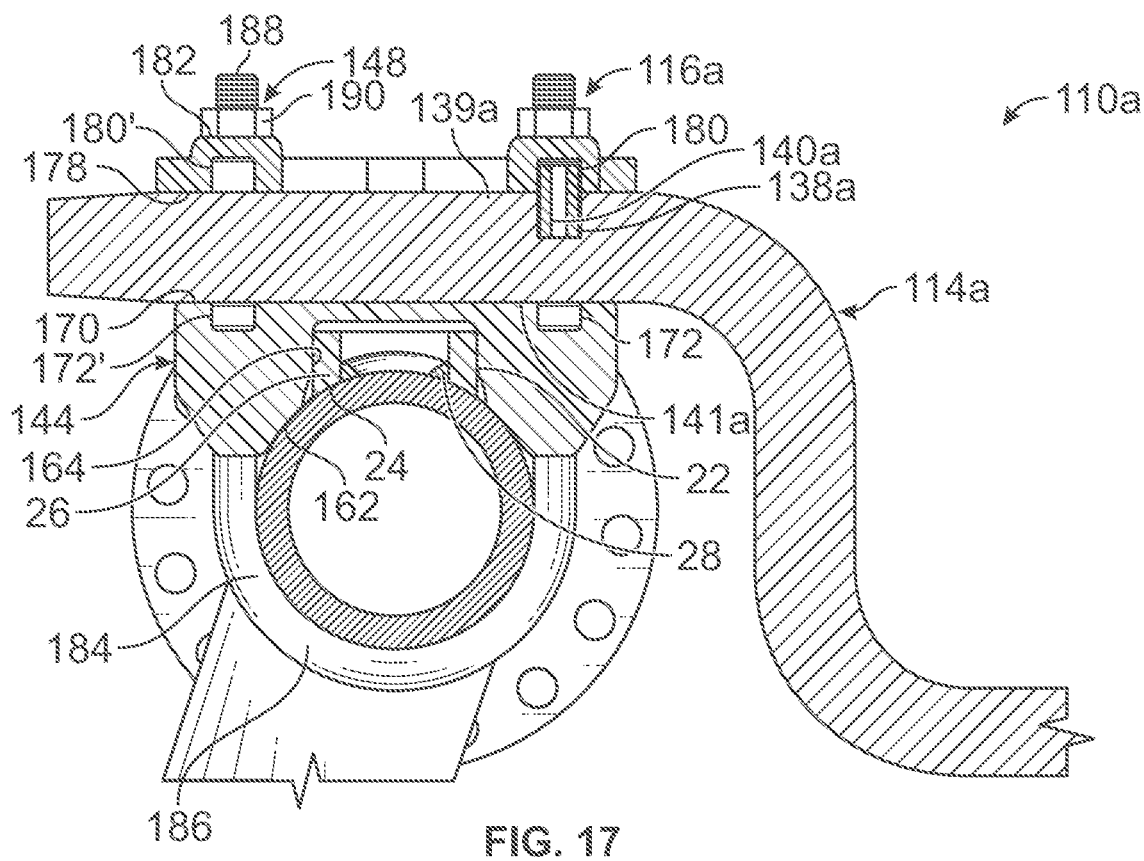
FIG. 17 is a cross-sectional side view of a third example that is similar to the second example shown in FIGS. 13-15, but having a locator element extending upward from the leaf spring.

Turning to FIG. 17, a third example 110a of a clamp group mounting of a leaf spring to a round axle including alignment features, includes a round axle 12, a leaf spring 114a and a clamp group 116a connecting the leaf spring 114a to the axle 12. The third example 110a is essentially similar to the second example shown in FIGS. 13-16, except that the leaf spring 114a includes a bore 138a in its upper surface 139a that does not extend through the lower surface 141a of the leaf spring 114a. A locator element 140a is received in the bore 138a in the upper surface 139a of the leaf spring 114a and in this third example, the recess 180 in the lower surface 178 of the top pad 146 also receives the locator element 140a extending upward from the upper surface 139a of the leaf spring 114a. The construction of the locator element 140a of this example may be similar to that which was described for the locator elements 40, 140 of the previous examples, but is shorter in length. The structure of the remainder of the third example is labeled with the same reference numbers and is the same as the second example 110 of FIGS. 13-16, so the previous description is incorporated herein and need not be repeated.

Figure 18:
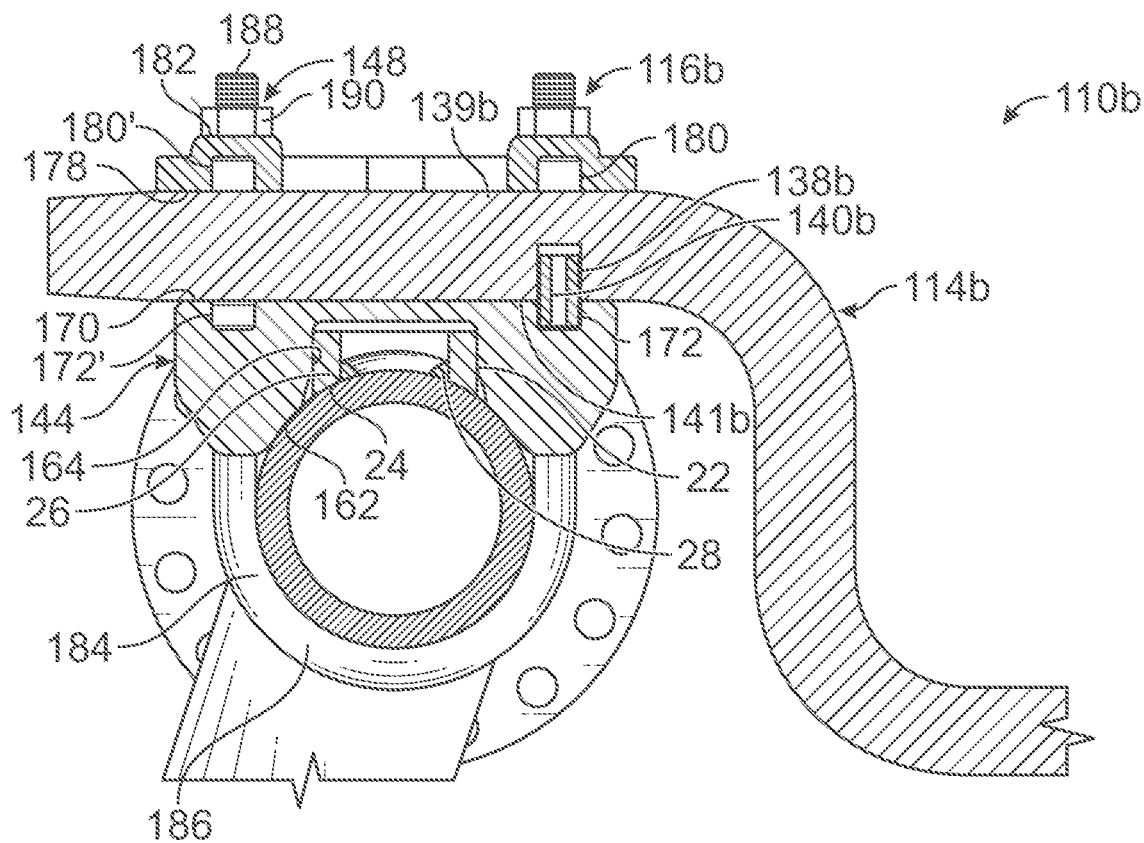
FIG. 18 is a cross-sectional side view of a fourth example that is similar to the second example shown in FIGS. 13-15, but having a locator element extending downward from the leaf spring.

Turning to FIG. 18, a fourth example 110b of a clamp group mounting of a leaf spring to a round axle including alignment features, includes a round axle 12, a leaf spring 114b and a clamp group 116b connecting the leaf spring 114b to the axle 12. The fourth example 110b is essentially similar to the second example shown in FIGS. 13-16, except that the leaf spring 114b includes a bore 138b in its lower surface 141b that does not extend through the leaf spring 114b. A locator element 140b is received in the bore 138b in the lower surface 141b of the leaf spring 144b and in this fourth example, the recess 172 in the upper surface 170 of the spring seat 144 receives the locator element 140b extending downward from the lower surface 141b of the leaf spring 114b. The construction of the locator element 140b of this example may be of similar to that which was described for the locator elements 40, 140 of the first and second examples, but is shorter in length. The structure of the remainder of the fourth example is labeled with the same reference numbers and is the same as the second example 110 of FIGS. 13-16, so the previous description is incorporated herein and need not be repeated.

In light of the above discussion, the drawings and the attached claims, it will be appreciated that a clamp group mounting of a leaf spring to a round axle in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such apparatus without departing from the scope of the attached claims, and that the claims are not limited to the preferred embodiment illustrated.

We claim:

1. A clamp group mounting of a leaf spring to a round axle including alignment features, comprising:
   a round axle, a leaf spring and a clamp group connecting the leaf spring to the axle;
   the axle extending laterally and having an arcuate upper surface and arcuate lower surface;
   a locator ring having a fish-mouth tapered lower end, and having the lower end welded to the arcuate upper surface of the axle;
   the leaf spring extending longitudinally and at least forward or rearward relative to the axle, and further comprising a bore that receives a locator element that extends at least upward or downward from the leaf spring;
   the clamp group comprising a spring seat, top pad and a plurality of fasteners that connect the top pad, leaf spring, and spring seat to the axle;
   the spring seat further comprising:
      a downward facing generally arcuate surface configured to receive the arcuate upper surface of the axle;
      a recess in the downward facing arcuate surface, wherein the recess receives the locator ring that is welded to the arcuate upper surface of the axle;
      a generally planar upper surface above which the leaf spring is positioned and further comprising a recess that receives the locator element extending downward from the leaf spring;
   the top pad further comprising:
      a generally planar lower surface above the leaf spring;
      an upper surface that engages the fasteners.

2. The clamp group mounting of claim 1 wherein the weld between the locator ring and the upper arcuate surface of the axle is located inside the locator ring.

3. The clamp group mounting of claim 1 wherein the locator ring is cylindrical.

4. The clamp group mounting of claim 1 wherein the recess in the lower arcuate surface of the spring seat is cylindrical.

5. The clamp group mounting of claim 1 wherein the recess in the lower arcuate surface of the spring seat is shaped and sized to provide a close fit relative to the locator ring.

6. The clamp group mounting of claim 1 wherein the generally planar upper surface of the spring seat further comprises a recess that receives the locator element which extends downward from the leaf spring.

7. The clamp group mounting of claim 1 wherein the spring seat further comprises laterally spaced apart upward extensions between which is located the generally planar surface above which the leaf spring is positioned.

8. The clamp group mounting of claim 7 wherein the laterally spaced apart upward extensions of the spring seat further comprise inward extending projections that engage the leaf spring.

9. The clamp group mounting of claim 8 wherein the inward extending projections that engage the leaf spring are deformed as the clamp group is connected to the axle.

10. The clamp group mounting of claim 1 wherein the downward facing generally arcuate surface of the spring seat further comprises lateral extensions.

11. The clamp group mounting of claim 1 wherein the locator element that extends at least upward or downward from the leaf spring further comprises a pin or stud.

12. The clamp group mounting of claim 1 wherein the bore that receives a locator element that extends at least upward or downward from the leaf spring leaf spring further comprises a vertical bore that extends downward into the upper surface of the spring, extends upward into the lower surface of the spring or extends through the leaf spring.

13. The clamp group mounting of claim 12 wherein the locator element received by the vertical bore extends from the leaf spring upward, downward or both upward and downward.

14. The clamp group mounting of claim 1 wherein each of the plurality of fasteners further comprises a U-shaped bolt having a head and threaded legs in combination with threaded nuts that are threadably received by the respective threaded legs.

15. The clamp group mounting of claim 14 wherein the upper surface of the top pad further comprises contoured surfaces in the form of saddles that receive the heads of the U-shaped bolts.

16. The clamp group mounting of claim 14 wherein the lower arcuate surface of the axle receives the heads of the U-shaped bolts and the upper surface of the top pad engages the threaded nuts of the fasteners.

17. The clamp group mounting of claim 1 further comprising a leaf spring retainer located between the top pad and leaf spring.

18. The clamp group mounting of claim 17 wherein the lower surface of the top pad further comprises a downward projection received by an aperture through the leaf spring retainer.

19. The clamp group mounting of claim 1 wherein the clamp group further comprises a lower clamp connected to the axle, spring seat, leaf spring and top pad by the plurality of fasteners.

20. The clamp group mounting of claim 19 wherein the lower clamp further comprises:
an upward facing generally arcuate surface configured to receive the arcuate lower surface of the axle;
at least one upward extending alignment locator positioned forward of the upward facing generally arcuate surface and at least one upward extending alignment locator positioned rearward of the upward facing generally arcuate surface.

21. The clamp group mounting of claim 20 wherein the lower clamp further comprises a plurality of apertures therethrough which receive the threaded legs of the U-shaped bolts.

22. The clamp group mounting of claim 20 wherein the spring seat further comprises:
at least one downward extending alignment locator positioned forward of the downward facing generally arcuate surface of the spring seat and vertically aligned with the upward extending alignment locator of the lower clamp positioned forward of the upward facing generally arcuate surface of the lower clamp, and at least one downward extending alignment locator positioned rearward of the downward facing generally arcuate surface of the spring seat and vertically aligned with the upward extending alignment locator of the lower clamp positioned rearward of the of the upward facing generally arcuate surface of the lower clamp.

23. The clamp group mounting of claim 22 wherein the downward extending alignment locators of the spring seat and vertically aligned upward extending alignment locators of the lower clamp are configured to block lateral movement of the spring seat relative to the lower clamp.

24. The clamp group mounting of claim 23 wherein the downward extending alignment locators of the spring seat further comprise channels that receive the vertically aligned upward extending alignment locators of the lower clamp.

25. The clamp group mounting of claim 22 wherein the downward extending alignment locators of the spring seat and the vertically aligned upward extending alignment locators of the lower clamp are shaped and sized to avoid simultaneous contact forward and rearward of the axle.

26. The clamp group mounting of claim 1 wherein the spring seat and top pad are configured to be reversibly mounted with respect to forward and rearward directions.

27. The clamp group mounting of claim 1 wherein the leaf spring further comprises a half leaf that extends forward from the clamp group mounting.

28. The clamp group mounting of claim 1 wherein the lower clamp further comprises a rearward extension that includes an air spring seat.

29. The clamp group mounting of claim 1 wherein the leaf spring further comprises a rearward extension that includes an air spring seat.

* * * * *